(12) United States Patent  
Hutchison et al.

(10) Patent No.: US 8,644,352 B1  
(45) Date of Patent: Feb. 4, 2014

(54) SYSTEM AND METHOD FOR ACCURATE TIME SAMPLING IN PRESENCE OF OUTPUT DELAY

(75) Inventors: Guy T. Hutchison, Santa Clara, CA (US); Martin White, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 300 days.

(21) Appl. No.: 13/044,412

(22) Filed: Mar. 9, 2011

Related U.S. Application Data

(60) Provisional application No. 61/313,575, filed on Mar. 12, 2010.

(51) Int. Cl.  
*H04J 3/06* (2006.01)  
*G06F 15/16* (2006.01)  
*H04L 7/00* (2006.01)

(52) U.S. Cl.  
CPC *H04J 3/0661* (2013.01); *H04L 7/00* (2013.01)  
USPC .......................................... 370/509; 709/248

(58) Field of Classification Search  
None  
See application file for complete search history.

(56) References Cited

U.S. PATENT DOCUMENTS

| | | | |
|---|---|---|---|
| 8,166,216 B1* | 4/2012 | Kondapalli | 709/230 |
| 8,428,045 B2* | 4/2013 | Gelter et al. | 370/350 |
| 8,446,896 B2* | 5/2013 | Bedrosian | 370/350 |
| 2007/0268938 A1* | 11/2007 | Dowd | 370/509 |
| 2009/0190589 A1* | 7/2009 | Bains et al. | 370/392 |
| 2010/0049964 A1* | 2/2010 | Kondapalli et al. | 709/236 |
| 2010/0309932 A1* | 12/2010 | Diab et al. | 370/503 |
| 2012/0082156 A1* | 4/2012 | Swartzentruber et al. | 370/389 |
| 2013/0132554 A1* | 5/2013 | Armbruster | 709/223 |

* cited by examiner

*Primary Examiner* — Timothy J Weidner

(57) ABSTRACT

A system and method for accounting for delay to accurately schedule a data packet for transmission between communicating devices. According to an aspect of the invention, a data packet to be scheduled is identified and the packet modified time, reflecting an estimation of the transmission time of the packet, and the scheduled transmission time, reflecting the time the packet should be scheduled to be transmitted, are calculated. A time stamp in the packet is adjusted to reflect the packet modified time and the packet is stored until either the packet modified time or the scheduled transmission time, when the packet is then transmitted.

18 Claims, 4 Drawing Sheets

100

SYSTEM AND METHOD FOR ACCURATE TIME SAMPLING IN PRESENCE OF OUTPUT DELAY

CROSS REFERENCE TO RELATED APPLICATIONS

This application claims the benefit of priority to previously filed U.S. provisional patent application Ser. No. 61/313,575, filed Mar. 12, 2010, entitled ACCURATE TIME SAMPLING IN PRESENCE OF OUTPUT DELAY. That provisional application is hereby incorporated by reference in its entirety.

FIELD

Aspects of the present invention relate generally to the field of data transmission, and more specifically to time sampling and synchronization between devices.

DESCRIPTION OF THE RELATED ART

In some systems, timing requirements in two communicating devices may require clock synchronization with accuracy within nanoseconds. In a distributed system, the synchronization of clocks between nodes or devices may be complicated by both the processing delay at each node and the delay incurred in the transmission of messages between nodes on a communications channel. Regardless of the efficiency of the communication process, there will be delay between i) the time a synchronization message is created and sent and ii) the time the message is received.

Thus time sampling and synchronization between two network nodes or other communication devices must take into consideration the processing and transmission delay to achieve accurate results. Conventionally, two nodes may synchronize clocks by any one of several methods. For example, a first node may transmit a sync message including a time stamp reflecting the reference time of the clock at the first node at the time the message was created. Then, upon receipt of the sync message, the second node may determine the system delay by comparing the receipt time to the reference time in the message and may estimate that the system delay between the first node and the second node is the difference between the two times. Then the second node may transmit an acknowledgement message to the first node, the acknowledgement message including the reference time at the time the acknowledgement message was created at second node. The acknowledgement message may additionally include the estimated system delay as calculated by the second node. Then upon receipt of the acknowledgement message, the first node may determine the roundtrip delay as the time between the reference time in the sync message and the reference time at the time the acknowledgement was received. The system delay may then be estimated as one-half the roundtrip delay. Alternatively, the delay between the acknowledgement message creation time and the acknowledgment message receipt time, that represents the system delay for transmission from the second node to the first node, may be estimated as the return delay.

However, simple estimation of the system delay may not be sufficient to synchronize both nodes with the level of accuracy that may be required. Then another method of synchronization using a two-step sync may be implemented, for example, as described in IEEE 1588. Conventionally, to implement a two-step sync, the first node may transmit a first sync message followed by a second time message, where the second time message includes the reference time at which the first message was sent. Then the second node may receive the accurate transmission time in the second message, thereby eliminating any inaccurate estimations of the processing delay incurred at the first node in preparing the message for transmission.

In some cases, the transmission of a second message in the two-step sync may use too many resources or otherwise involve too much overhead. Then, a more efficient synchronization may be achieved with a one-step sync. Conventionally, with a one-step sync, the first device may transmit a sync message containing a time stamp as part of the message packet. When the first bit of the message packet begins transmission, the time stamp in the packet may be updated with the current reference time. The time stamp change must be initiated and completed in the narrow window of time between when the first bit of the packet is output on the channel and when the first bit of the time stamp is output on the channel. However, the change in timestamp may also necessitate other changes to the packet, in the error detection bits for example. Each additional packet change must then also be initiated and completed in the narrow window of time between when the first bit of the packet is output to the channel and when the bits requiring change are output on the channel. Thus the one-step sync may not be possible if the window during which packet changes may be made is too small, for example if too many changes to the packet are required, or if additional security measures such as 802.1AE encryption is desired or would render the packet unreadable and therefore unchangeable.

SUMMARY

In accordance with one aspect of the invention, before transmission of a data packet between devices, the data packet may be identified as a packet to be scheduled. Then a packet modified time, reflecting an estimation of the transmission time of the packet, and a scheduled transmission time, reflecting the time the packet is scheduled for transmission, may be calculated. A time stamp in the data packet may be adjusted to reflect the packet modified time. In accordance with one embodiment, the identification, calculation, and adjustment may be carried out in a packet recognition module, but separate hardware may be used to carry out any or all of these functions. The data packet may then be stored until either the packet modified time or the scheduled transmission time.

BRIEF DESCRIPTION OF THE DRAWINGS

The foregoing and other aspects of various embodiments of the present invention are described in the following detailed description in conjunction with the accompanying figures. Similar reference numbers are used in the figures to indicate functionally similar elements.

DETAILED DESCRIPTION

Time sampling and clock synchronization may be accurately provided where the synchronization messages are delayed before transmission and the time stamped transmission reference time is set as a predetermined estimate of the packet transmission time. Then the packets may be held back from transmission until the predetermined estimate time. Using a fixed latency, the time stamped transmission reference time may always be accurate despite the variable processing delay accrued in preparing the packet for transmission.

Figure 1:
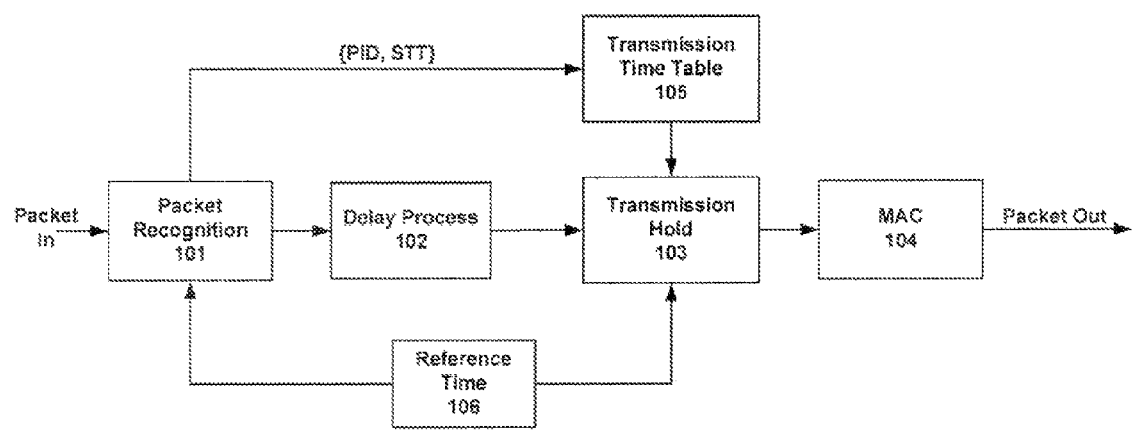
FIG. 1 is a simplified block diagram illustrating exemplary components of a data transmitter.

FIG. 1 is a simplified block diagram illustrating exemplary components of a data transmitter. In the described example, transmitter 100 includes a packet recognition module 101, a delay process module 102, a transmission hold module 103, a media access controller (MAC) 104, a transmission time table 105 and a reference time module 106.

Packets may be output from a processor, switch or other unit that creates or transmits data packets and intercepted by packet recognition module 101 before the packets are output on a communications channel. The channel may be a transmission medium provided by communications or computer networks that provide communication between transmitter 100 and a receiving node via MAC 104, for example a wired or wireless network.

In one embodiment, packet recognition module 101 parses the packet contents to identify packets that include a time stamp or that otherwise should be accurately scheduled. Such packets may be marked for further scheduling and modification and associated with a packet identifier (PID). The PID may be any unique identifier, including, for example, an identifier assigned by the packet recognition module 101, an identifier computed based on the contents of the packet, or an identifier assigned to the packet before the packet is received at the packet recognition module 101. In this example, packets not identified for further scheduling are processed and output on the channel without modification.

For each packet identified for further scheduling and modification, the packet recognition module 101 may store the PID with a scheduled transmission time (STT) in the transmission time table 105. In this example, the STT is an estimated time when the packet will be passed to the MAC 104 for output on the channel. The STT may be calculated with reference to an estimation of the system delay, including any expected processing delay that may be incurred at the delay process module 102 and any additional system delay that may be attributed to the packet recognition module 101 or the transmission hold module 103. The STT may additionally include a small measurement of additional time to account for any unexpected delays or other irregularities. The packet may then be modified such that the sync message reference time or other packet time stamp is adjusted to reflect a packet modified time (PMT), which in this example is the estimated time that the packet will be transmitted on the channel.

In this example, delay process module 102 performs operations on the packet that may introduce delay in the transmission of the packet after the packet is created. For example, delay process module 102 may alter the packet contents or make the packet unreadable to unauthorized persons, for example, by encrypting the packet. Operations performed by delay process module 102 may have a fixed or bounded maximum delay time. Then the delay process maximum latency (DPML) may be predetermined such that the processing delay incurred at the delay process module 102 may be accurately estimated to calculate an appropriate SIT. Additionally, regardless of the changes to the packet resulting from the operations performed by the delay process module 102, the transmitter may distinguish individual packets with reference to the PID associated with each packet.

Once an accurate estimation of the DPML is calculated, the STT may be calculated in accordance with Equation 1 where RT=the reference time in the transmitter 100.

$$STT=RT+DPML \quad \text{Eq. 1}$$

The transmission hold module 103 may store the processed packets until the STT for each packet is reached. The transmission time table 105 may maintain a record of the SIT associated with the PID for each scheduled packet that has been intercepted by the transmitter 100 and not yet output on the channel. The transmission hold module 103 may then look up the STT in the transmission time table 105 for each stored packet by the PID of the stored packet to identify the transmission time for the packet. Then, at the scheduled time, the transmission hold module 103 may pass the scheduled packet to the MAC 104 for transmission on the channel.

The PID of each scheduled or stored packet may be unique within the transmitter such that each scheduled packet may be output on the channel at the correct associated STT. A PID may then be reused after the scheduled packet with which it was associated is output and the associated entry is removed from the transmission time table 105.

The MAC 104 may have an additional fixed processing delay or constant MAC transmission latency (MTL). Then the PMT may include a calculation of the MTL in accordance with Equation 2.

$$PMT=RT+DMPL+MTL=STT+MTL \quad \text{Eq. 2}$$

Reference time module 106 may comprise a timer that may be used throughout the transmitter 100. The timer may provide a reference time that may be used by packet recognition module 101 to establish the STT, or by transmission hold module 103 to hold and transmit scheduled packets at the scheduled time. The reference time may be synchronized to an external clock or a free running clock within the transmitter 100.

According to another feature, the PMT may be equivalent to the STT. Then, because the PMT may not include additional time in anticipation of the MTL, the transmission hold module 103 may release the packet for transmission before the SIT to compensate for the estimated processing delay incurred at the MAC 104 such that the packet may be transmitted at the STT. The PMT may then be calculated in accordance with Equation 3.

$$PMT=STT=RT+DMPL \quad \text{Eq. 3}$$

A receiver may receive a packet that was modified and scheduled by transmitter 100 and may therefore receive an accurate sync message with the PMT as the time stamp in the packet. Then the receiver may synchronize an internal reference time with the received PMT.

Figure 2:
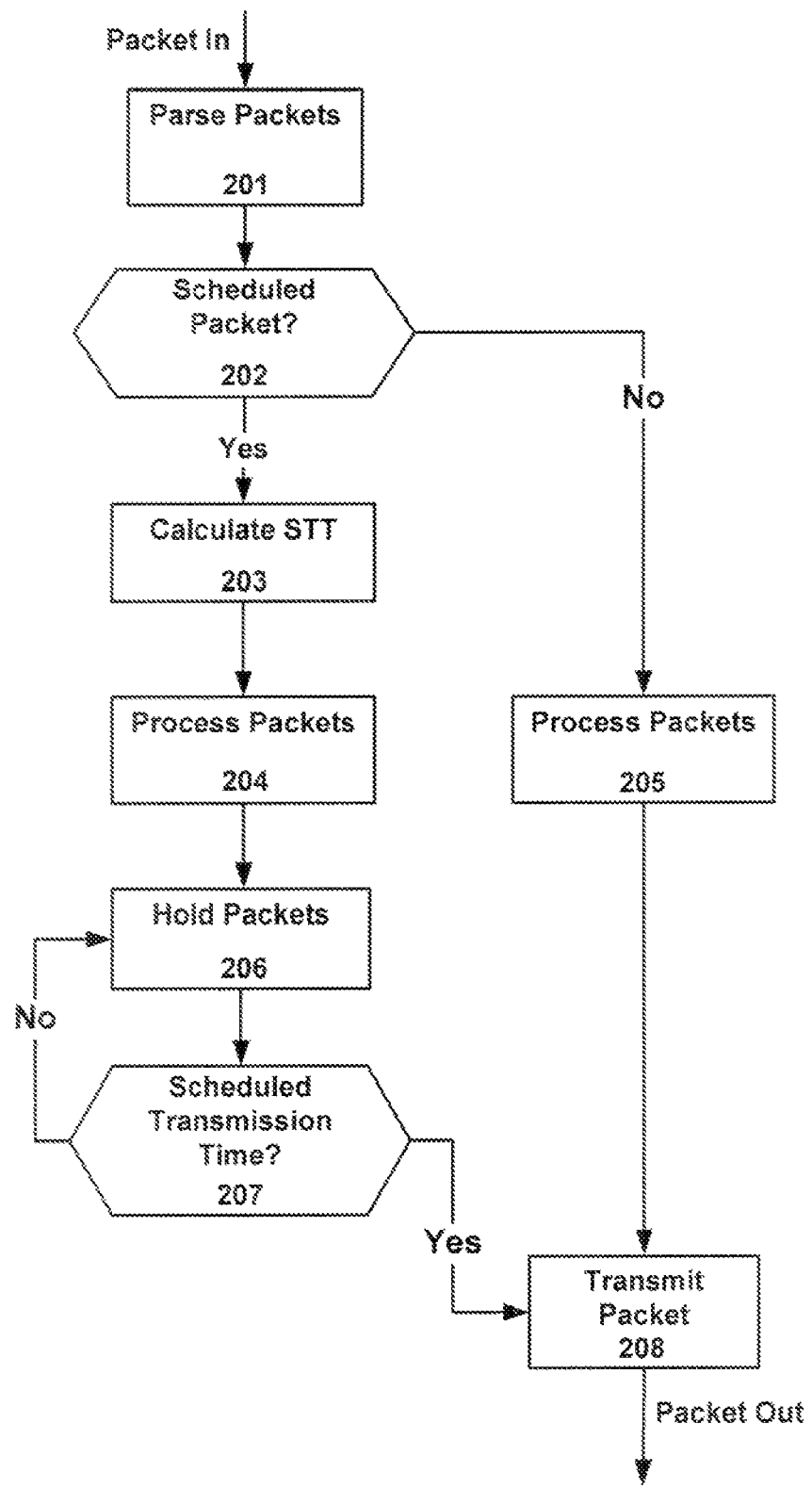
FIG. 2 is a simplified flow diagram illustrating a process for scheduling a packet for transmission.
Figure 3:
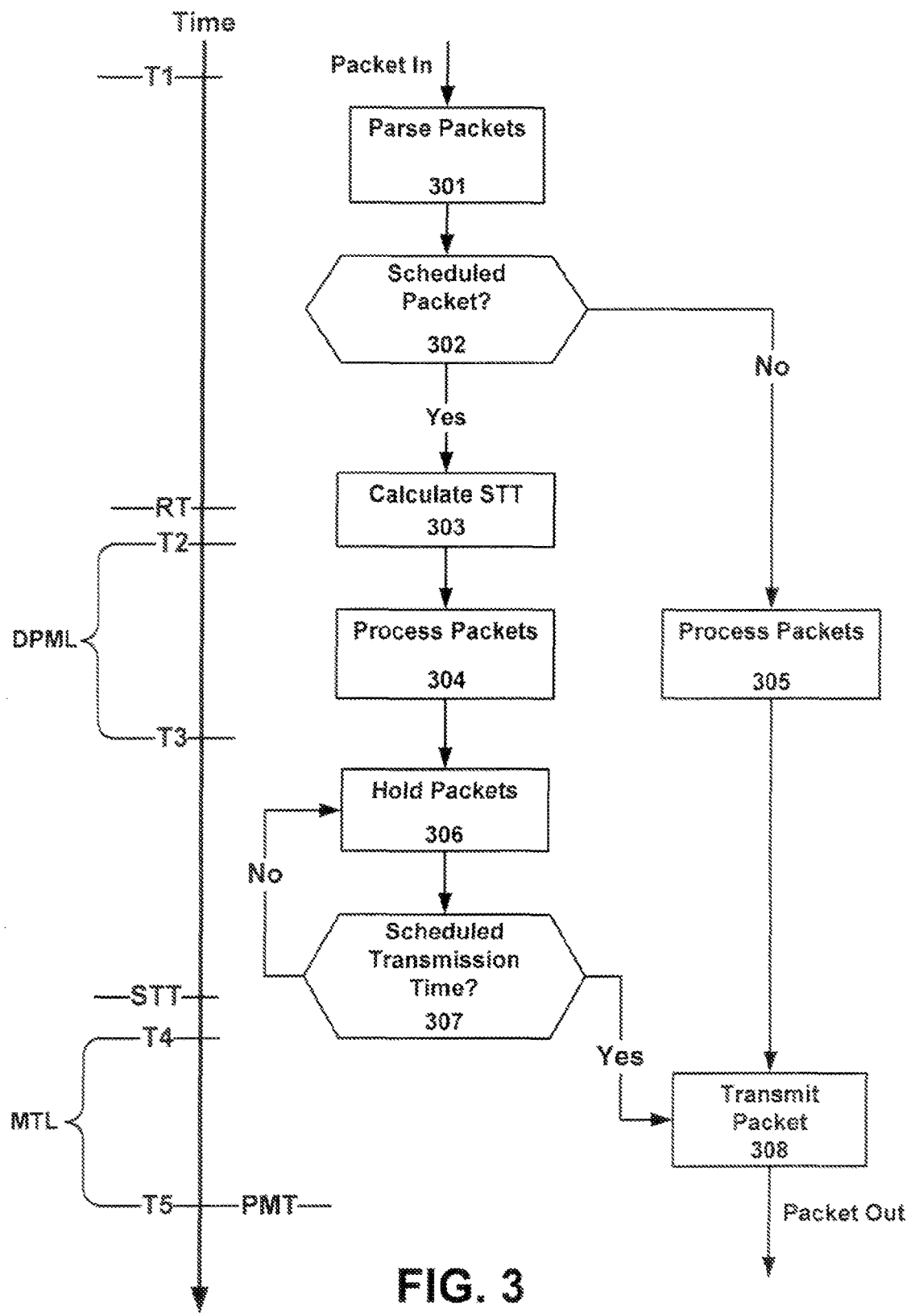
FIG. 3 is a simplified flow diagram illustrating the timing of a process for scheduling a packet for transmission.
Figure 4:
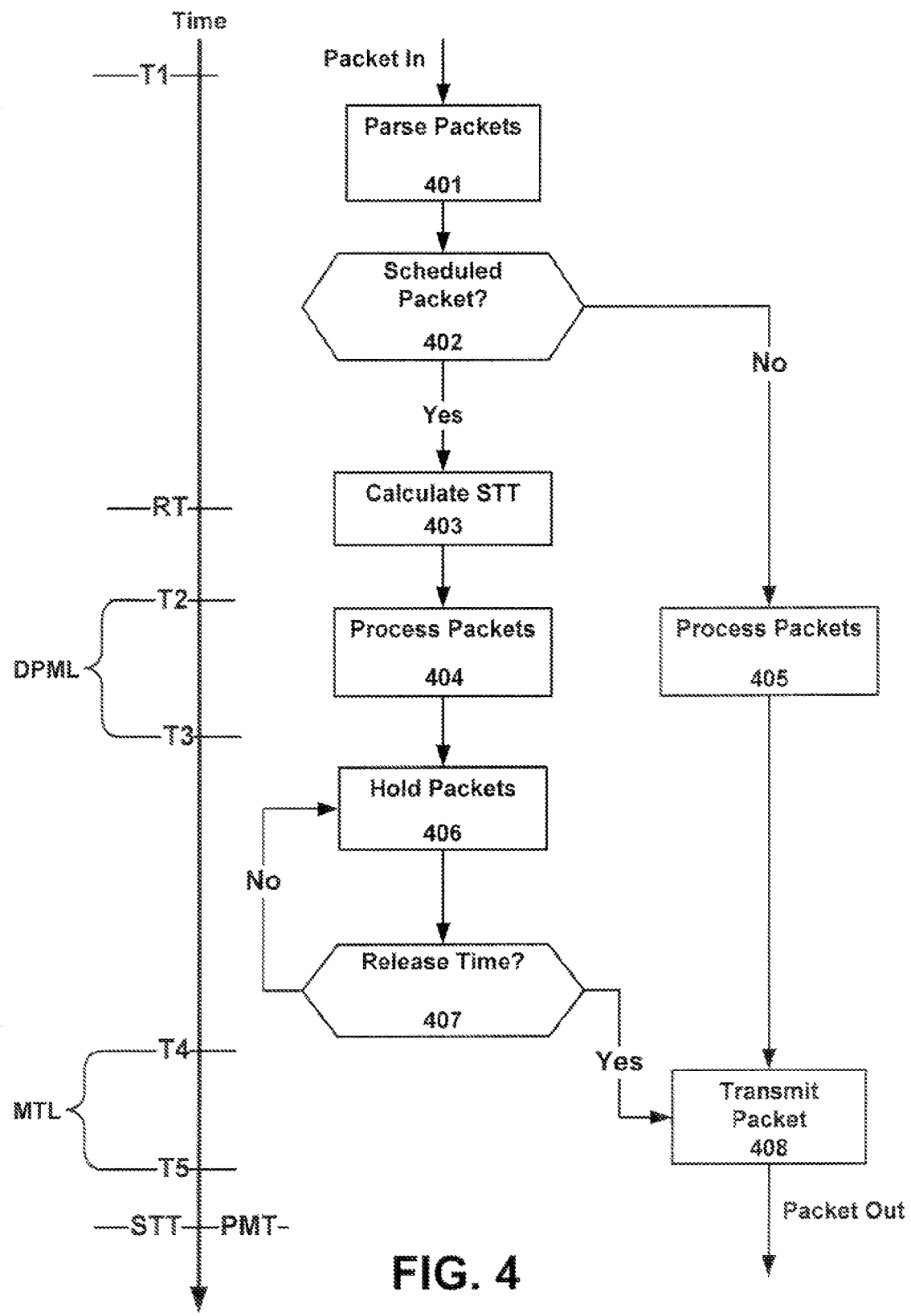
FIG. 4 is a simplified flow diagram illustrating the timing of a process for scheduling a packet for transmission.

FIGS. 2-4 are simplified flow diagram illustrating a process for scheduling a packet for transmission. The blocks in these Figures are similar except that, as will be seen with reference to FIGS. 3 and 4, timings are provided in accordance with the equations discussed above.

In FIG. 2, at block 201, a packet may be received and parsed to determine if the packet includes a time stamp or may otherwise need scheduling and modification in order to provide an accurate transmission reference time. If the packet is not identified as a scheduled packet at block 202, the packet may be processed and prepared for transmission without scheduling at block 205 and output on a channel at block 208. However, if the packet was marked for further scheduling and modification at block 202, the scheduled transmission time for the packet, as an estimation of the packet transmission time, may then be calculated at block 203. The scheduled transmission time may include the estimated latency until the packet will be released for transmission on the channel as well as an additional measure of time in anticipation of other unexpected delays.

At block 204, the packet may be processed, for example, by modifying the packet time stamp or sync message reference time to reflect the estimated time that the packet will be transmitted, by changing the packet contents, for example by adjusting the error correction bits, or by encrypting the packet. The packet may then be held at block 206 until the scheduled transmission time is reached at block 207. If the scheduled transmission time is reached at block 207, the packet may then be output on the channel at block 208.

In FIG. 3, similarly to FIG. 2, at block 301, a packet may be received and parsed at time T1. If a packet is marked for further scheduling and modification at block 302, an estimation of the packet transmission time for the packet may then be calculated at block 303. The estimated transmission time (PMT) may be calculated in accordance with Equation 2 where RT is the current reference time. An accurate PMT may be approximately equivalent to the time the packet is transmitted on the channel T5. Then, the scheduled transmission time (STT) may be calculated as the time the packet should be released for transmission in accordance with Equation At block 304, the packet may be processed. As shown, the delay process maximum latency (DPML) may be the length of time between the time the processing operations are initiated, T2, through the time the processing operations may be completed and processed packet stored, T3. The packet may then be held at block 306 until the STT is reached at block 307. When the STT is reached at block 307, the packet may then be output on the channel at block 308. The estimated delay incurred during output of the packet on the channel (MTL), is shown as the time the packet is released for transmission, T4, through the time the packet is transmitted on the channel, T5.

In FIG. 4, unlike FIG. 3, the scheduled transmission time is set to be equivalent to the estimated transmission time. Thus, at block 401, a packet received at time T1 may be parsed to identify packets for scheduling and modification. If a packet is marked for further scheduling and modification at block 402, an estimation of the packet transmission time for the packet may then be calculated at block 403. The estimated transmission time (PMT) may be calculated in accordance with Equation 3 where RT is the current reference time. Then, the scheduled transmission time (STT) may be set as equivalent to the PMT.

At block 404, the packet may be processed. As shown, the delay process maximum latency (DPML) may be the length of time between when the processing operations may be initiated, T2, through the time the processing operations may be completed and the processed packet stored, T3. The packet may then be held at block 406 until the release time. When the release time is reached at block 407, the packet may then be output on the channel at block 408. The estimated delay incurred during output of the packet on the channel (MTL), is shown as the time the packet is released for transmission, T4, through the time the packet is transmitted on the channel, T5. As shown, because the STT may not account for the estimation of the MTL, the packet may be released for transmission at some interval (at least the anticipated MTL) before the STT to compensate for the estimated processing delay incurred during output of the packet.

The foregoing discussion identifies functional blocks that may be used in data transmission systems constructed according to various embodiments of the present invention. In implementation, the system may be embodied as a hardware system, in which case the functional blocks may correspond to circuit sub-systems within a transmission system. The circuit sub-systems may be implemented together on a single integrated circuit or a single chip. Alternatively, the system may be embodied as specially programmed hardware, in which case the blocks illustrated may correspond to program modules within data transmission software running on a data transmission system. In yet another embodiment, the transmission system may be a hybrid system involving both hardware circuit systems and software programs.

Moreover, the functional blocks described herein need not be provided as separate units. For example, although FIG. 1 illustrates the components of the transmitter 100, including the packet recognition module 101, the transmission time table 105 and the transmission hold module 103 as separate units, in one or more embodiments, some or all of them may be integrated and they need not be separate units. Additionally, it is noted that the arrangement of the blocks in FIGS. 2-4 do not necessarily imply a particular order or sequence of events, nor are they intended to exclude other possibilities. For example, the operations depicted at blocks 201 through 203 or at blocks 206 and 207 may occur substantially simultaneously with each other or may be incorporated in a single operation.

While the invention has been described in detail above with reference to some embodiments, variations within the scope and spirit of the invention will be apparent to those of ordinary skill in the art. Thus, the invention should be considered as limited only by the scope of the appended claims.

What is claimed is:

1. A method comprising:
    identifying a data packet to be scheduled;
    calculating a packet modified time reflecting an estimation of a transmission time for the identified data packet;
    adjusting a time stamp in the identified data packet to reflect the packet modified time;
    calculating a scheduled transmission time including at least an expected processing delay for the identified data packet;
    storing the identified data packet until one of the packet modified time or the scheduled transmission time; and
    after having stored the identified data packet until one of the packet modified time or the scheduled transmission time, transmitting the identified data packet on a channel, wherein the scheduled transmission time for the identified data packet is earlier than the packet modified time by an amount of time equal to an estimation of a delay required to output the identified data packet on the channel.

2. The method of claim 1, wherein the packet modified time includes an estimation of a delay required to output the identified data packet on the channel.

3. The method of claim 1, further comprising associating the identified data packet with a packet identifier.

4. The method of claim 3, further comprising storing the packet modified time with the packet identifier.

5. The method of claim 3, further comprising storing the scheduled transmission time with the packet identifier.

6. The method of claim 1, further comprising preparing the identified data packet for transmission.

7. The method of claim 6 wherein said preparing comprises recalculating an error bit in the identified data packet.

8. The method of claim 6 wherein said preparing comprises encrypting the identified data packet.

9. The method of claim 6, wherein the packet modified time includes an estimation of a delay required to prepare the identified data packet for transmission.

10. The method of claim 6, wherein the scheduled transmission time includes an estimation of a delay required to prepare the identified data packet for transmission.

11. A system comprising:
a packet recognition module to
identify a data packet to be scheduled for transmission,
calculate a packet modified time reflecting an estimation of a transmission time for the identified data packet,
adjust a time stamp in the identified data packet to reflect the packet modified time, and
calculate a scheduled transmission time including at least an expected processing delay for the identified data packet;
a data storage to store the identified data packet until one of the packet modified time or the scheduled transmission time; and
a controller to output the identified data packet on a channel subsequent to the identified data packet having been stored until one of the packet modified time or the scheduled transmission time, wherein the scheduled transmission time for the identified data packet is earlier than the packet modified time by an amount of time equal to an estimation of a delay required to output the identified data packet on the channel.

12. The system of claim 11 wherein the packet modified time includes an estimation of a delay incurred at the controller.

13. The system of claim 11 wherein the identified data packet is associated with a packet identifier.

14. The system of claim 13 wherein the packet modified time is stored in the data storage with the packet identifier.

15. The system of claim 13 wherein the scheduled transmission time is stored in the data storage with the packet identifier.

16. The system of claim 11 further comprising:
a delay process module to prepare the identified data packet for transmission.

17. The system of claim 16 wherein the packet modified time includes an estimation of a delay incurred at the delay process module.

18. The system of claim 16 wherein the scheduled transmission time includes an estimation of a delay incurred at the delay process module.

\* \* \* \* \*